Jan. 4, 1944.  E. W. HUEBNER  2,338,330
APPARATUS FOR MAKING TUBULAR RIVETS
Filed May 1, 1943  2 Sheets-Sheet 1
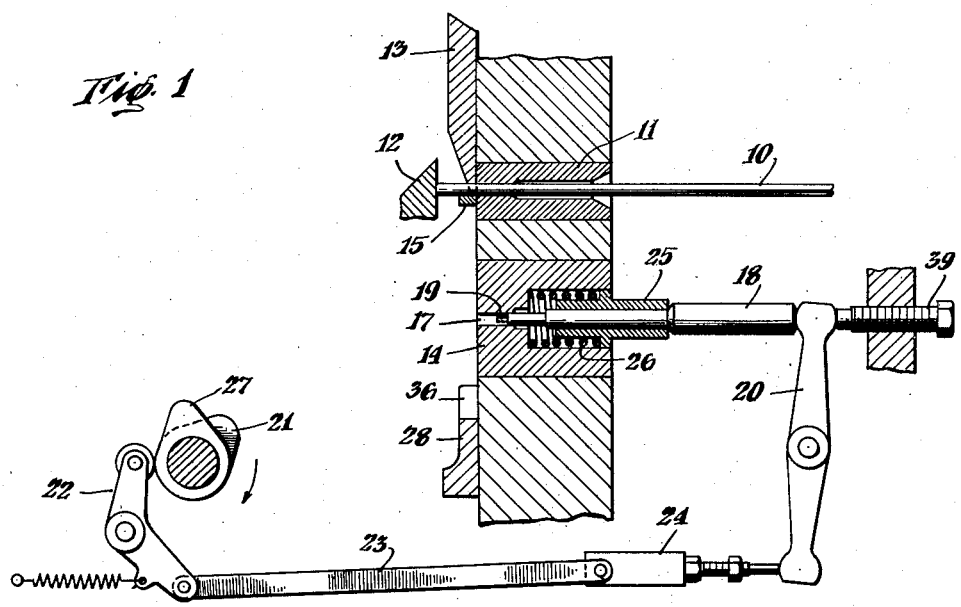
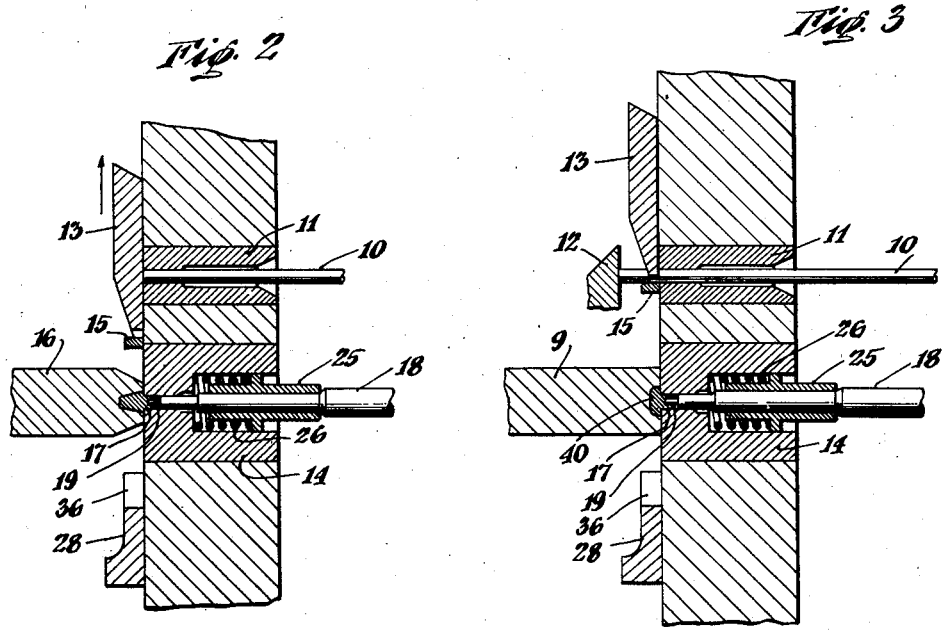
INVENTOR.
Ernest W. Huebner
BY
Robbin + Carlson
ATTORNEYS.

Jan. 4, 1944. E. W. HUEBNER 2,338,330
APPARATUS FOR MAKING TUBULAR RIVETS
Filed May 1, 1943 2 Sheets-Sheet 2
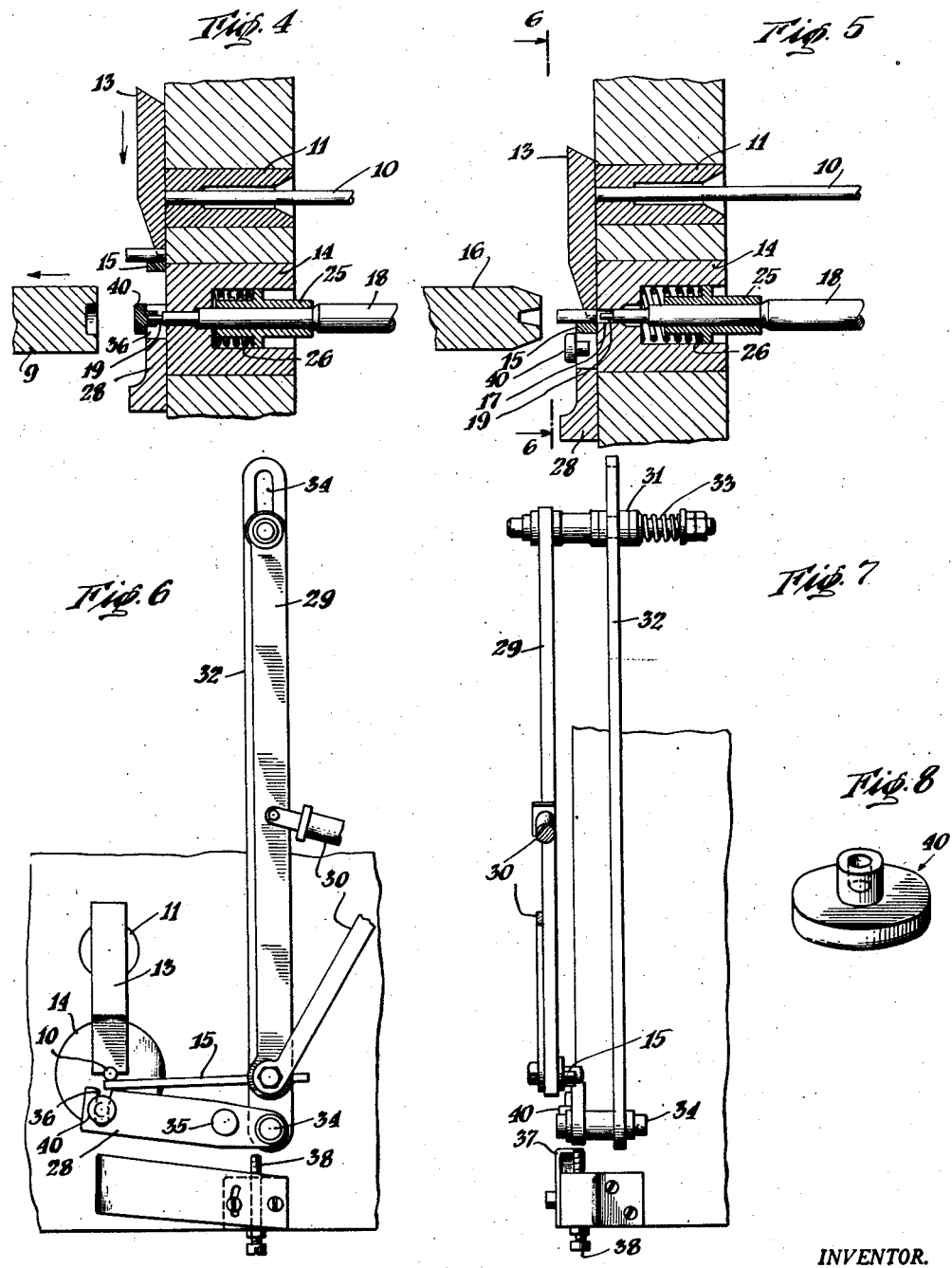
INVENTOR.
Ernest W. Huebner
BY Robbin + Carlson
ATTORNEYS Patented Jan. 4, 1944

2,338,330

UNITED STATES PATENT OFFICE 2,338,330

APPARATUS FOR MAKING TUBULAR RIVETS

Ernest W. Huebner, Indianapolis, Ind., assignor to P. R. Mallory & Co., Inc., Indianapolis, Ind., a corporation of Delaware Application May 1, 1943, Serial No. 485,284

3 Claims. (Cl. 10—15)

This invention relates to tubular rivets and apparatus for making them.

An object of the invention is to improve tubular rivets and apparatus for their manufacture.

Other objects of the invention will be apparent from the description and claims.

In the drawings:

Figure 1 is a fragmentary view, in section, of a heading machine for making tubular rivets at the beginning of a cycle of operation;

Figure 2 illustrates the first coining step in making a rivet;

Figure 3 illustrates a subsequent coining step;

Figures 4 and 5 illustrate the removal of the completed rivet;

Figure 6 is a face view illustrating the stripping device for removing the finished rivet;

Figure 7 is a side view of the device; and

Figure 8 shows a completed tubular rivet.

A feature of the invention resides in the simplified procedure and apparatus for making the rivet. Another feature resides in the stripping mechanism for removing the completed rivet from the die.

In general, the process of making a tubular rivet comprises the steps, of cutting a suitable length of metal from a wire or rod which is fed into the machine, then transferring the cut off piece to a die where it receives a first blow from a coning punch to push one end into a hole in the die and begin the formation of a head on the other end. At the same time an extrusion pin of suitable dimensions begins the formation of a recess in the end of the rod which has been pushed into the hole in the die. A second heading punch then completes the heading operation and at the same time the pin completes the formation of the recess in the shank of the rivet. After the second punch has moved away, the extrusion pin performs the function of a knock out pin, forcing the rivet out of the hole in the die. A stripper plate then engages the completed rivet and carries it away as the extrusion pin recedes into the hole in the die.

Referring to the drawings wherein the operating parts of the machine and their operation is illustrated, the wire 10 is fed into the machine through a cut off die or quill 11 against a stop 12 which measures off a predetermined length of wire. A cut off blade 13 then descends, cutting off the required length of wire as shown in Figure 1 and continues its descent to carry the cut off piece to the center of the header die or tool 14. A carrying finger 15 grips the wire firmly to the cut off blade during this period of travel.

When the wire has been carried to the center of the die, a first blow punch or coning punch 16 descends over the end of the wire piece and drives one end of the wire into the central hole 17 in the header die until it engages the reduced tip 19 of extruding pin 18. The punch then expands the outer end of the wire to begin the formation of a head. During this operation the reduced tip 19 of pin 18 begins the extrusion of a recess in the end of the wire, as shown in Figure 2.

Pin 18 is supported in the die in a sliding collar 25 which is urged toward the rear of the die by a helical spring 26 held in a recess in the die.

Upon completion of the first blow the coning punch recedes and a finish blow punch or anvil 9 delivers a blow to the head of the partially formed rivet to complete the rivet as shown in Figure 3. As the finish blow die strikes, pin 18 is driven further into the end of the rivet shank to complete the extrusion of a recess therein by a cam arrangement comprising cam 21, lever 22, link rods 23 and 24, and lever 20. Lever 20 engages the rear end of pin 18 and is normally held against set-screw stop 39 by pin 18.

As the finish blow punch leaves the die, pin 18 is momentarily retracted by spring 26 and is then advanced by cam 27 to carry the finished rivet 40 out of the hole in the die as shown in Figure 4. At the same time stripper plate 28 is moved under the rivet head and as pin 18 again recedes it carries the rivet away from the face of the die as shown in Figure 5. At this time the cut-off blade 13 is descending with a new section of wire.

Referring to Figures 6 and 7 which show the mechanism for operating the stripper plate, the bar 29 which carries gripping finger 15 is supported by the machine by braces 30 to move up and down in unison with the cutter blade 13. It carries at its upper end a frictional gripping means 31 which holds a stripper actuating bar 32 between its gripping faces by the pressure of spring 33. Bar 32 has a slotted aperture 34 which receives the bolt carrying the gripping means and permits relative movement between bars 29 and 32. This movement is opposed by the friction gripping means.

Bar 32 carries at its lower end a pin 34. Stripper plate 28 is mounted on a stationary pivot 35 with one end having an aperture for receiving pin 34 and the other end having a slot 36 therein for engaging the shank of the rivet. A stop plate 37 is secured to the working face of the machine immediately below stripper plate 28 and a set-screw stop 38 is mounted below the right hand end of the plate as seen in Figure 6.

In operation of the stripper mechanism it will be noted that as the cutter blade is descending with a new section of wire as shown in Figure 4, for example, bar 29 carrying the gripping finger 15 is also descending. This tends to carry stripper actuating bar 32 downward and rotate stripper plate 28 about its pivot 35 to bring slot 36 toward the center of the die where it engages the shank of the previously completed rivet which at this time has been pushed out by pin 18. As the knife 13 and gripper arm 15 continues to descend, arm 15 strikes stripper plate 28, moving it downward away from the center of the die. This causes stripper actuating bar 32 to slide upward in the friction gripping means 31.

When the cutter blade and carrying arm reach the center of the die with the new section of wire this section is engaged by the coning die and the cutter blade and carrying finger begin to move upward, and bar 29 also moves upward carrying the friction gripping means. This supplies an upward force to bar 32 rotating the rivet carrying end of stripper plate 28 downward against stop plate 37 at which position the completed rivet falls off.

The completed rivet 40 is shown in Figure 8.

By the apparatus of the present invention it is possible to make a complete tubular rivet with standard heading tools in an efficient and simple manner with a minimum of set-up, time and effort.

The use of a frictional gripping means in the drive of a stripping mechanism insures that the mechanism will adjust itself correctly at all times, preventing danger of jamming or damage to the machine.

While specific embodiments of the invention have been described, it is intended to cover the invention broadly within the spirit and scope of the appended claims.

Note: In the general outline of this procedure the general movements are described as moving up and down, however this arrangement will work horizontally, vertically or in any plane.

What is claimed is:

1. In a tubular rivet making machine of the type wherein a moving holder carries a blank to the center of a die where it is engaged by at least one punch which forms a head thereon and drives a portion of the blank into a hole in the die where an extruding pin extrudes a recess in the end of the blank after which the punch recedes and the pin ejects the completed tubular rivet from the hole in the die, the combination with said moving holder of a frictional gripping means moved in unison therewith, a link frictionally engaged by said gripping means and a stripper plate driven by said link toward the center of said die during descent of said moving holder toward said die and carried away from said die during retraction of said holder.

2. In a tubular rivet making machine of the type wherein a moving holder carries a blank to the center of a die where it is engaged by at least one punch which forms a head thereon and drives a portion of the blank into a hole in the die where an extruding pin extrudes a recess in the end of the blank after which the punch recedes and the pin ejects the completed tubular rivet from the hole in the die, the combination with said moving holder of a frictional gripping means moved in unison therewith, a link frictionally engaged by said gripping means and a stripper plate pivoted on said machine at the opposite edge of said die from said moving holder with one end comprising a stripping arm movable to the center of said die to remove a complete rivet and the other end connected to said link whereby descent of said moving holder toward the center of said die rotates said stripping arm toward the center of said die until engagement of said arm by said moving holder moves said arm off said die resisted only by the friction of said gripping means.

3. In a tubular rivet making machine of the type wherein a moving holder carries a wire blank down across the working face of the machine to the center of a die set in said face where it is engaged by at least one punch which forms a head thereon and drives an end of said wire blank into a hole in said die where an extruding pin movable in said hole extrudes a recess in the end of said wire blank after which the final punch recedes and the pin carries the completed rivet out of said hole in the die, the combination with said moving holder of a frictional gripping means moved in unison therewith, a link bar frictionally engaged by said gripping means and extending along the direction of motion of said gripping means, a stripper plate pivoted on said working face below said die with one end comprising a stripper arm rotatable on its pivot to the center of said die and having a slot for engaging a completed rivet and the other end, on the opposite side of said pivot connected to the lower end of said link bar, whereby motion of said moving holder and gripping means toward said die rotates said stripper plate to bring the stripper arm thereof to the center of said die to remove a completed rivet and engagement of said stripper arm by said moving holder will drive said arm away from said die opposed only by said friction gripping means.

ERNEST W. HUEBNER.